J. C. Macdonald,
Globe Valve,
Nº 17,973. Patented Aug. 11, 1857.

UNITED STATES PATENT OFFICE.

JOHN C. MACDONALD, OF CINCINNATI, OHIO.

VALVULAR ARRANGEMENT IN FAUCETS, &c.

Specification of Letters Patent No. 17,973, dated August 11, 1857.

*To all whom it may concern:*

Be it known that I, JOHN C. MACDONALD, of the city of Cincinnati, in the county of Hamilton and State of Ohio, have invented a new and useful Improvement in Stop-Valves or Valve-Cocks; and I do hereby declare that the following is a full, clear, and exact description of the same, reference being had to the accompanying drawings, forming part of this specification, in which—

Figure 1:
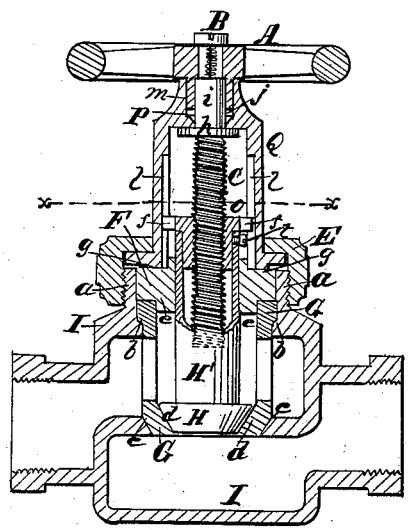
Figure 2:
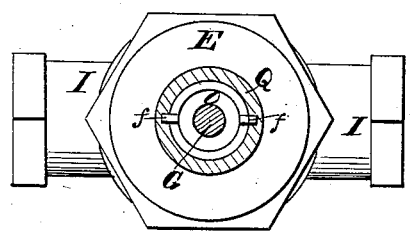

Figure 1, is a central vertical section of a valve cock with my improvements. Fig. 2, is a horizontal section of the same in the line $x, x$, of Fig. 1.

Similar letters of reference indicate corresponding parts in both figures.

This invention consists in a certain arrangement of and mode of fitting the valve seat stem, screw, nut and guide by which the valve stem is prevented getting out of line and the valve getting untrue to its seat, and convenience is afforded for re-grinding the valve when necessary.

To enable others skilled in the art to make and use my invention I will proceed to describe its construction and operation.

I, is the body made substantially of the usual form, and having a screw thread $a$, cut around the top of its exterior.

G is the seat piece containing the valve seat $d, d$, said piece being separate and turned to fit the body and ground thereinto with two bevels $b, b$, and $c, c$.

F, is the metal diaphragm ring or valve guide fitted into the top of the seat piece G, with a ground joint at $e, e$.

O, is the nut for the valve screw C, having two projecting feathers $f, f$, working in guide grooves $l, l$, in the cap Q, which is fitted with a ground joint at $g, g$, to the top of the guide F, and secured by the cap nut E.

H, is the valve having a hollow stem H′, into the top of which the nut O, is fitted and, in which it is secured by a set screw $t$.

The valve screw C, works through the nut O, into the hollow valve stem H′, and is provided with a collar $h, h$, which fits up against the crown of the cap Q. The neck $i$ of the screw C, is fitted to turn freely in the crown of the cap which contains a stuffing box $m$, in which is a packing ring P, of india rubber covered by a metal washer $j$, upon which rests the hub of the wheel or lever A, which is fitted to the head of the screw C, so as to be incapable of turning thereon and is secured by the head of a screw B, which screws into the head of the screw C, and also serves both to confine the packing and to hold the collar $h, h$, of the screw up against the crown of the cap for the purpose of preventing the screw moving longitudinally. The screw C, is left handed and should have two or three threads to give the valve a quick opening and closing movement.

The opening and closing movement of the valve is effected by turning the screw in one or the other direction, the screw being confined longitudinally, and the nut being secured in the valve stem and prevented turning, rendering it imperative for the valve to move longitudinally to the screw when the latter is turned. During this movement of the valve the stem cannot get out of the proper line, that being prevented by the arrangement of the stem, the guide F, the screw C, and the stuffing box.

When the valve requires grinding, the cap nut E is removed, the screw C is turned till it works out of the nut and the cap Q, removed leaving the valve stem free to be turned by hand, the guide F, keeping the stem H′, true to the valve seat. By the mode of arranging and fitting the parts, provision is also made for renewing or replacing any part when worn out without removing or disconnecting the body I.

What I claim as my invention and desire to secure by Letters-Patent is:

The arrangement of the valve stem H′, the nut O, the valve guide F, the screw C, and the cap or screw and nut guide Q, which also contains the stuffing box $m$, for the purposes herein set forth.

JOHN C. MACDONALD.

Witnesses:
HUGH McDONALD,
WILHELM STÖCKER.